United States Patent
Day et al.

(10) Patent No.: US 7,720,840 B2
(45) Date of Patent: May 18, 2010

(54) METHOD APPLYING TRANSITIVE CLOSURE TO GROUP BY AND ORDER BY CLAUSES

(75) Inventors: Paul Reuben Day, Rochester, MN (US); Brian Robert Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 672 days.

(21) Appl. No.: 10/754,011

(22) Filed: Jan. 8, 2004

(65) Prior Publication Data

US 2005/0154725 A1 Jul. 14, 2005

(51) Int. Cl.
*G06F 7/00* (2006.01)
*G06F 17/30* (2006.01)

(52) U.S. Cl. ...................................... 707/714
(58) Field of Classification Search ........................ 707/5
See application file for complete search history.

(56) References Cited

U.S. PATENT DOCUMENTS

| | | | | |
|---|---|---|---|---|
| 5,598,559 A | * | 1/1997 | Chaudhuri | 707/2 |
| 5,875,447 A | * | 2/1999 | Goel et al. | 707/4 |
| 5,960,427 A | * | 9/1999 | Goel et al. | 707/4 |
| 6,662,175 B1 | * | 12/2003 | Ghazal et al. | 707/2 |
| 6,757,677 B2 | * | 6/2004 | Pham et al. | 707/5 |
| 6,850,933 B2 | * | 2/2005 | Larson et al. | 707/4 |
| 7,191,169 B1 | * | 3/2007 | Tao | 707/2 |
| 2005/0071331 A1 | * | 3/2005 | Gao et al. | 707/4 |

OTHER PUBLICATIONS

Interim Guidelines for Examination of Patent Applications for Patent Subject Matter Eligibility; Annex IV; pp. 50-57; Nov. 22, 2005.*
Bulletin of the Technical Committee on Data Engineering. vol. 16 No. 4. IEEE Computer Society: Dec. 1993.*

* cited by examiner

*Primary Examiner*—John R. Cottingham
*Assistant Examiner*—Kimberly Lovel
(74) *Attorney, Agent, or Firm*—Wood, Herron & Evans, LLP

(57) ABSTRACT

A database engine and optimizer framework support the use of transitive closure to assist in rewriting GROUP BY and ORDER BY clauses to reduce the number of referenced tables (optimally to a single table if possible) and to free the join order selected for the query plan. The SQL parser and optimizer, by performing transitive closure on the selection, or search, conditions is able to identify which fields referenced by the ORDER BY and GROUP BY clauses can be replaced with equivalent fields to improve the performance of the query. In one instance, the fields are replaced so that the ORDER BY or GROUP BY clause references only a single table. If more than one such possible ORDER BY or GROUP BY clause exists, then the optimizer selects from among the different possible clauses to select the one that provides the best performing join order.

19 Claims, 2 Drawing Sheets

METHOD APPLYING TRANSITIVE CLOSURE TO GROUP BY AND ORDER BY CLAUSES

FIELD OF THE INVENTION

The invention relates to database management systems, and in particular, to query optimization utilized in such systems.

BACKGROUND OF THE INVENTION

Databases are used to store information for an innumerable number of applications, including various commercial, industrial, technical, scientific and educational applications. As the reliance on information increases, both the volume of information stored in most databases, as well as the number of users wishing to access that information, likewise increases. Moreover, as the volume of information in a database, and the number of users wishing to access the database, increases, the amount of computing resources required to manage such a database increases as well.

Database management systems (DBMS's), which are the computer programs that are used to access the information stored in databases, therefore often require tremendous resources to handle the heavy workloads placed on such systems. As such, significant resources have been devoted to increasing the performance of database management systems with respect to processing searches, or queries, to databases.

Improvements to both computer hardware and software have improved the capacities of conventional database management systems. For example, in the hardware realm, increases in microprocessor performance, coupled with improved memory management systems, have improved the number of queries that a particular microprocessor can perform in a given unit of time. Furthermore, the use of multiple microprocessors and/or multiple networked computers has further increased the capacities of many database management systems.

From a software standpoint, the use of relational databases, which organize information into formally-defined tables consisting of rows and columns, and which are typically accessed using a standardized language such as Structured Query Language (SQL), has substantially improved processing efficiency, as well as substantially simplified the creation, organization, and extension of information within a database. Furthermore, significant development efforts have been directed toward query "optimization", whereby the execution of particular searches, or queries, is optimized in an automated manner to minimize the amount of resources required to execute each query.

Through the incorporation of various hardware and software improvements, many high performance database management systems are able to handle hundreds or even thousands of queries each second, even on databases containing millions or billions of records. However, further increases in information volume and workload are inevitable, so continued advancements in database management systems are still required.

One area that has been a fertile area for academic and corporate research is that of improving the designs of the "query optimizers" utilized in many conventional database management systems. The primary task of a query optimizer is to choose the most efficient way to execute each database query, or request, passed to the database management system by a user. The output of an optimization process is typically referred to as an "execution plan," "access plan," or just "plan" and is frequently depicted as a tree graph. Such a plan typically incorporates (often in a proprietary form unique to each optimizer/DBMS) low-level information telling the database engine that ultimately handles a query precisely what steps to take (and in what order) to execute the query. Also typically associated with each generated plan is an optimizer's estimate of how long it will take to run the query using that plan.

An optimizer's job is often necessary and difficult because of the enormous number (i.e., "countably infinite" number) of possible query forms that can be generated in a database management system, e.g., due to factors such as the use of SQL queries with any number of relational tables made up of countless data columns of various types, the theoretically infinite number of methods of accessing the actual data records from each table referenced (e.g., using an index, a hash table, etc.), the possible combinations of those methods of access among all the tables referenced, etc. An optimizer is often permitted to rewrite a query (or portion of it) into any equivalent form, and since for any given query there are typically many equivalent forms, an optimizer has a countably infinite universe of extremely diverse possible solutions (plans) to consider. On the other hand, an optimizer is often required to use minimal system resources given the desirability for high throughput. As such, an optimizer often has only a limited amount of time to pare the search space of possible execution plans down to an optimal plan for a particular query.

There are a few SQL criteria, or clauses, that result in re-ordering a result set that is returned for a query. Examples of such clauses include the GROUP BY and ORDER BY clauses. A GROUP BY clause aggregates records in the result set that have a common value in a specified field or fields. An ORDER BY clause arranges the records of the result set in a specified order.

To illustrate the use of these clauses, consider the example of an Entertainment Agency database that includes a table for each entertainer and a table for each engagement. An example query that fetches the entertainer's name and contract price for each engagement might resemble:

SELECT Entertainers.StageName, Engagements.Month, Engagements.ContractPrice
    FROM Entertainers
    INNERJOIN Engagements
    ON Entertainers.ID=Engagements.ID
    ORDER BY Entertainers.StageName, Engagement.Month The result set returned would resemble:

| StageName | Month | ContractPrice |
| --- | --- | --- |
| Al Buck | January | $200.00 |
| Al Buck | January | $500.00 |
| Al Buck | February | $185.00 |
| Al Buck | March | $200.00 |
| Al Buck | March | $110.00 |
| Carol Trio | January | $1600.00 |
| Carol Trio | February | $410.00 |
| Carol Trio | February | $680.00 |
| Carol Trio | February | $100.00 |

In particular, the ORDER BY clause causes the result set to be returned in descending alphabetical order based on the entertainers stage name and then on the month (in calendar order). If the query is modified slightly to include a GROUP BY clause as below:

```
SELECT Entertainers.StageName, Engagements.Month,
   SUM(Engagements.ContractPrice)
FROM Entertainers
INNERJOIN Engagements
ON Entertainers.ID=Engagements.ID
GROUP BY Entertainers.StageName, Engagements.Month
```

Then the result set is aggregated for each unique combination of fields within the GROUP BY clause. The result set would return:

| StageName | Month    | ContractPrice |
|-----------|----------|---------------|
| Al Buck   | January  | $700.00       |
| Al Buck   | February | $185.00       |
| Al Buck   | March    | $310.00       |
| Carol Trio| January  | $1600.00      |
| Carol Trio| February | $1190.00      |

When the GROUP BY and ORDER BY clauses include references to more than one table as in the above example (i.e., Entertainers and Engagements), the optimizer must create a temporary file to hold the result set in order to perform the GROUP BY or ORDER BY operation. The creation of the temporary file, however, often slows the performance of the query.

Moreover, where queries are interactive, the need to create a temporary becomes even more problematic. Interactive queries often return initial records to a user while the query continues to concurrently execute to generate the entire result set. Thus, because queries like those above must finish running entirely and the temporary file created before the GROUP BY and ORDER BY operations can be performed, interactive queries often appear to be slow and unresponsive.

When a GROUP BY or ORDER BY clause references only one table, however, then creation of a temporary file is not needed in order to perform the re-ordering of the result set. Thus, the above performance penalties can be avoided. Accordingly, there is an unmet need in the prior art of optimizing SQL queries that reduces the number of different tables referenced in ORDER BY and GROUP BY clauses.

Queries which the optimizer can handle often include Join operations of various types. Join operations involve searching across two tables in various ways to identify records that match search conditions. One area that optimizers can particularly optimize a query plan having these join operations involves what is known as "join order". A query plan can include a query that involves joining of three or more tables. Because a single join is limited to accessing two tables, such multi-table joins are performed in sequence according to a particular order. For example, a query that involves joining tables A, B and C can often be performed as a join of table A and B followed by a join of table A and C. Alternatively, in many instances, the same query can be performed as a join of Table A and C followed by the join of Table A and B.

When an ORDER BY or GROUP BY clause is present in a join operation, the optimizer is locked into a particular join order even if that order may not be optimal when performing the ordering or grouping according to an index. For example, in the above examples, the first field of the ORDER BY and GROUP BY clauses is Entertainers.StageName. Under these circumstances, the optimizer must lock Entertainers as the first table in the join order. This requirement prevents the optimizer from selecting a join order that may be more optimal. Accordingly, there is also an unmet need in the prior art of optimizing SQL by rewriting ORDER BY and GROUP BY clauses so as to expand the set of possible the join orders from which an optimizer can select.

SUMMARY OF THE INVENTION

Embodiments of the present invention include a database engine and optimizer framework that support the use of transitive closure to assist in rewriting GROUP BY and ORDER BY clauses to reduce the number of referenced tables (optimally to a single table if possible) and to free the join order selected for the query plan. The SQL parser and optimizer, by performing transitive closure on the selection, or search, conditions are able to identify which fields referenced by an ORDER BY and GROUP BY clauses can be replaced with equivalent fields to improve the performance of the query. In one instance, the fields are replaced so that the ORDER BY or GROUP BY clause references only a single table. If more than one such possible ORDER BY or GROUP BY clause exists, then the optimizer selects from among the different possible clauses to select the one that provides the best performing join order.

One aspect of the present invention relates to a method for optimizing a database query, where the database query includes criteria that references a plurality of tables and operates to re-order a result set generated for the database query. In accordance with this aspect, transitive closure analysis is applied to the query; and based on the transitive closure analysis, the criteria are re-written in such a manner as to reduce the number of tables referenced thereby.

Another aspect of the present invention relates to a method for optimizing a database query, wherein the database query includes criteria that operates to re-order a result set of the database query and requires creating a temporary file during operation. In accordance with this aspect, transitive closure analysis is applied to the query; and the criteria is re-written, based on the transitive closure analysis, to generate a modified criteria. This modified criteria operates to re-order a result set of the database query and avoids creating a temporary file during operation.

Yet another aspect of the present invention relates to a method for optimizing a database query, the database query involving a plurality of join operations and a plurality of search conditions. In accordance with this aspect, transitive closure analysis is applied to the plurality of search conditions to determine a subset of equivalent search fields. Based on the transitive closure analysis, a criteria is rewritten. This criteria operates to re-order a result set of the database query, and is re-written to generate a set of respective modified criteria that each reference one or more equivalent search fields.

DETAILED DESCRIPTION

As mentioned above, the embodiments discussed hereinafter utilize a database engine and optimizer framework that support the use of transitive closure to assist in rewriting GROUP BY and ORDER BY clauses to reduce the number of referenced tables (optimally to a single table if possible) and to free the join order selected for the query plan. The SQL parser and optimizer, by performing transistive closure on the selection, or search, conditions is able to identify which fields referenced by the ORDER BY and GROUP BY clauses can be replaced with equivalent fields to improve the performance of the query. Transitive closure is a technique useful with directed graphs that also has applicability to SQL optimization. Fundamentally, transitive closure determines that if A=B and B=C, then A=C. A specific implementation of such a database engine and optimizer framework capable of supporting this functionality in a manner consistent with the invention will be discussed in greater detail below. However, prior to a discussion of such a specific implementation, a brief discussion will be provided regarding an exemplary hardware and software environment within which such an optimizer framework may reside.

Hardware/Software Environment

Figure 1:
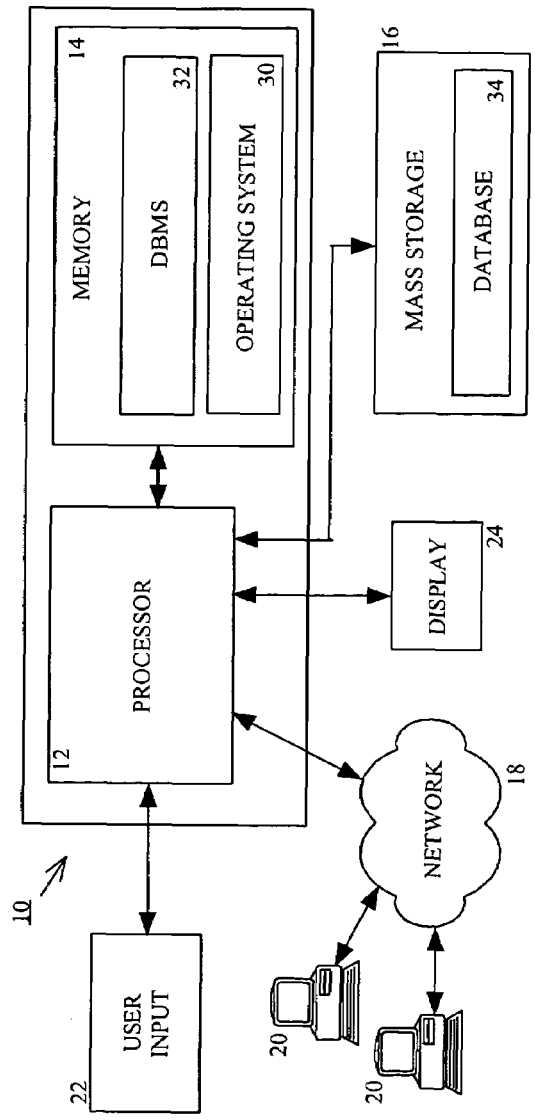
FIG. 1 is a block diagram of a networked computer system incorporating a database management system consistent with the invention.

Turning now to the Drawings, wherein like numbers denote like parts throughout the several views, FIG. 1 illustrates an exemplary hardware and software environment for an apparatus 10 suitable for implementing a database management system that incorporate rewriting ORDER BY and GROUP BY clauses consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer", although it should be appreciated the term "apparatus" may also include other suitable programmable electronic devices consistent with the invention.

Computer 10 typically includes at least one processor 12 coupled to a memory 14. Processor 12 may represent one or more processors (e.g., microprocessors), and memory 14 may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on a mass storage device 16 or on another computer coupled to computer 10 via network 18 (e.g., a client computer 20).

Computer 10 also typically receives a number of inputs and outputs for communicating information externally. For interface with a user or operator, computer 10 typically includes one or more user input devices 22 (e.g., a keyboard, a mouse, a trackball, a joystick, a touchpad, and/or a microphone, among others) and a display 24 (e.g., a CRT monitor, an LCD display panel, and/or a speaker, among others). Otherwise, user input may be received via another computer (e.g., a computer 20) interfaced with computer 10 over network 18, or via a dedicated workstation interface or the like.

For additional storage, computer 10 may also include one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may include an interface with one or more networks 18 (e.g., a LAN, a WAN, a wireless network, and/or the Internet, among others) to permit the communication of information with other computers coupled to the network. It should be appreciated that computer 10 typically includes suitable analog and/or digital interfaces between processor 12 and each of components 14, 16, 18, 22 and 24 as is well known in the art.

Computer 10 operates under the control of an operating system 30, and executes or otherwise relies upon various computer software applications, components, programs, objects, modules, data structures, etc. (e.g., database management system 32 and database 34, among others). Moreover, various applications, components, programs, objects, modules, etc. may also execute on one or more processors in another computer coupled to computer 10 via a network 18, e.g., in a distributed or client-server computing environment, whereby the processing required to implement the functions of a computer program may be allocated to multiple computers over a network.

Figure 2:
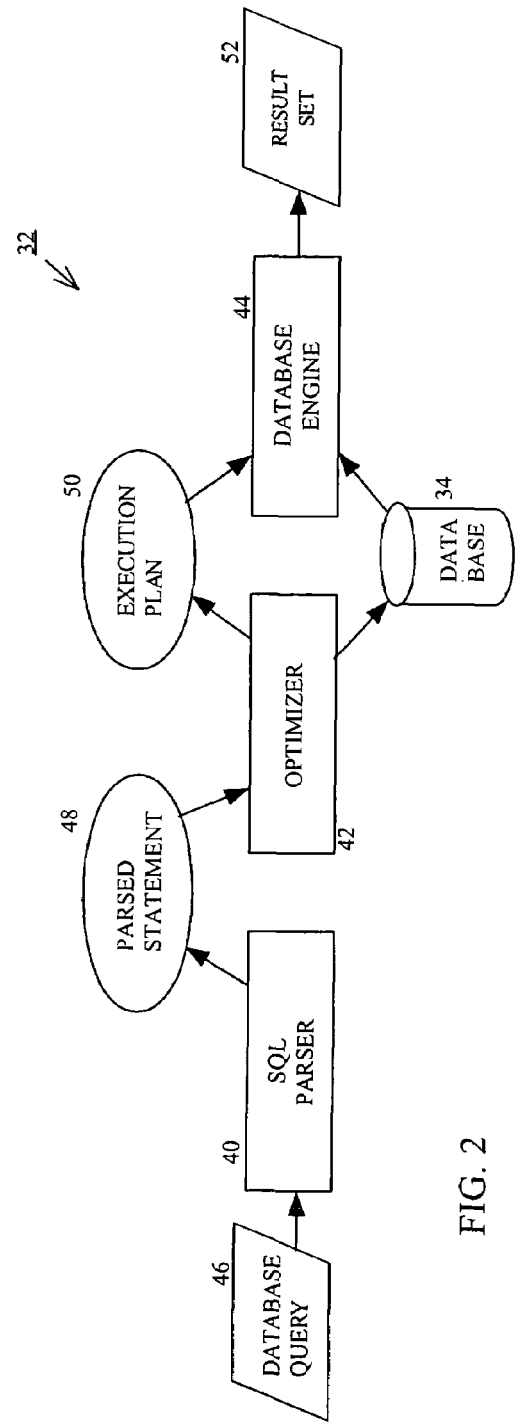
FIG. 2 is a block diagram illustrating the principal components and flow of information therebetween in the database management system of FIG. 1.

Turning briefly to FIG. 2, an exemplary implementation of database management system 32 is shown. The principal components of database management system 32 that are relevant to query optimization are an SQL parser 40, optimizer 42 and database engine 44. SQL parser 40 receives from a user a database query 46, which in the illustrated embodiment, is provided in the form of an SQL statement. SQL parser 40 then generates a parsed statement 48 therefrom, which is passed to optimizer 42 for query optimization. As a result of query optimization, an execution or access plan 50 is generated, often using data such as platform capabilities, query content information, etc., that is stored in database 34. Once generated, the execution plan is forwarded to database engine 44 for execution of the database query on the information in database 34. The result of the execution of the database query is typically stored in a result set, as represented at block 52.

Other components may be incorporated into system 32, as may other suitable database management architectures. Other database programming and organizational architectures may also be used consistent with the invention. Therefore, the invention is not limited to the particular implementation discussed herein.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIGS. 1 and 2 is not intended to limit the present invention. Indeed, those skilled in the art will recognize that other alternative hardware and/or software environments may be used without departing from the scope of the invention.

Transitive Closure Review

As mentioned earlier, transitive closure is a well known group theory analysis and it can be advantageously applied to optimizing SQL queries in accordance with principles of the present invention. An example is provided below illustrating what transitive closure is and what results therefrom.

An exemplary SQL statement is:
SELECT X.f3, Z.f2 from X
INNER JOIN Y ON X.f1=Y.f1
INNER JOIN Z ON Y.f1=Z.f2
GROUP BY X.f3, Z.f2

First, and to help understand terminology, this SELECT statement includes various search conditions (e.g., X.f1=Y.f1; Y.f1=Z.f2) and these search conditions include search fields (e.g., X.f1; Y.f1, Z.f2). This particular SQL statement includes a criteria that re-orders the result set; that criteria is a GROUP BY clause referencing two fields X.f3 and Z.f2. The term "field" is usually synonymous with "column" or "column of a table". Therefore, X.f3 is field f3 in table X and Y.f1 is field f1 in table Y, etc.

Transitive closure analysis on the search fields reveals that for the records returned by this query, X.f1 will equal Z.f2 based on the search conditions that require that X.f1=Y.f1 and Y.f1=Z.f2. Accordingly, transitive closure establishes the equivalency of X.f1 and Z.f2. The optimizer can take advantage of this determination of equivalency when investigating ways to modify the GROUP BY clause so as to improve query performance. In this example, the query can be rewritten as:
SELECT X.f3, Z.f2 from X
INNER JOIN Y ON X.f1=Y.f1
INNER JOIN Z ON Y.f1=Z.f2
GROUP BY X.f3, X.f1

In this format, the GROUP BY clause only references a single table and, therefore, can be implemented by an index over that single table. Implementing of the GROUP BY clause in this manner avoids the use of a temporary file.

Figure 3:
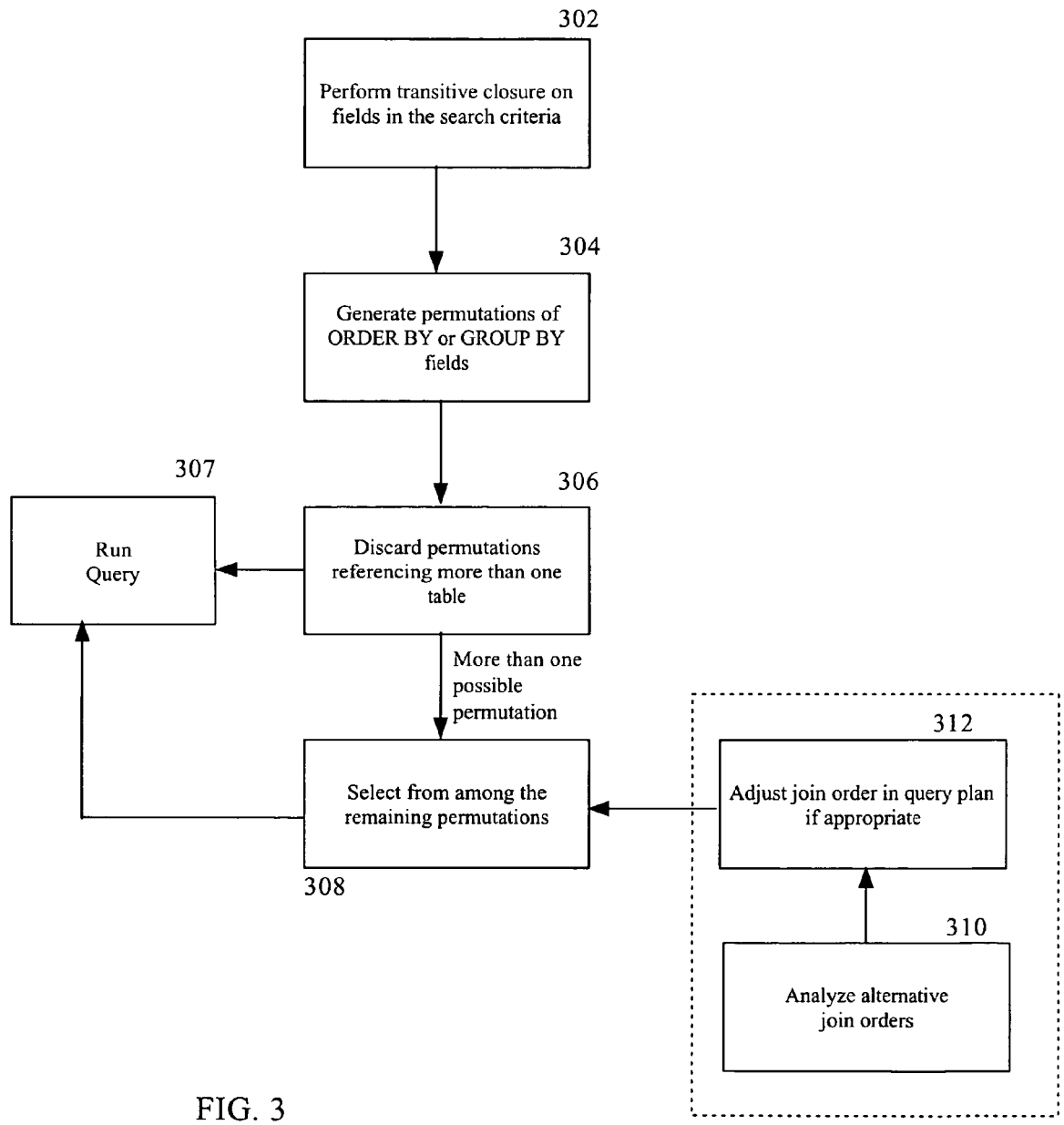
FIG. 3 illustrates a flowchart of an exemplary method for rewriting GROUP BY and ORDER BY clauses based on transitive closure analysis.

FIG. 3 illustrates a flowchart of an exemplary method by which an optimizer relies on transitive closure to rewrite GROUP BY and ORDER BY clauses in a way that improves query performance. In step 302, the optimizer identifies the search fields and determines through transitive closure analysis which of the search fields are equivalent to one another. Accordingly, for each search field, a list of equivalents is identified.

In step 304, the optimizer turns to the ORDER BY clause or GROUP BY clause and identifies the fields within this clause. With each field of the clause identified, the optimizer creates all the possible equivalent permutations based on the analysis of step 302. In the example SQL statement above, X.f3, Z.f2 is one possible permutation as is X.f3, X.f1. Also, X.f3, Y.f1 is a possible permutation that is equivalent.

The purpose of rewriting the ORDER BY and GROUP BY clause is to have it reference a single table. Doing so avoids the need to create a temporary file to hold the result set before re-ordering it. With only a single table referenced, the result set can be ordered or grouped according to an index over that table. Thus, the optimizer, in step 306, discards permutations that reference different tables in order to identify a permutation referencing a single file. As a result, X.f3, Z.f2 and X.f3, Y.f1 are discarded leaving X.f3, X.f1. If an index exists over X.f3, X.f1, then this index is used to perform the GROUP BY operation. Alternatively, a temporary index can be generated over X.f3 and X.f1, to perform the GROUP BY operation.

The query plan with the rewritten GROUP BY or ORDER BY clause may be passed to the database engine and executed, in step 307. Because only one table is referenced in the GROUP BY or ORDER BY clause, the query is performed without creating an intermediate temporary file, thereby improving performance, especially performance of interactive queries. It is possible that no permutation will be identified, in step 306, that references only a single table, in this case, the original query with its GROUP BY or ORDER BY clause remaining unchanged is advantageously passed to the database engine for execution in step 307.

In the above example, only one permutation remained and it was trivial for the optimizer to select the best permutation. If, however, more than one permutation survives after step 306, the optimizer will select, in step 308, the best permutation according to more traditional performance analysis. One particular area that the optimizer will investigate when generating the query plan is the join order if the query includes nested join operations such as in the above SQL example. The join operations in the example can theoretically be implemented with different join orders such as, for example, (X InnerJoin Y) InnerJoin Z or by (X InnerJoin Z) InnerJoin Y or, even by (Z InnerJoin X) Innerjoin Y. Optimizers have a number of algorithms for estimating the performance cost of each of these join orders and will select the best performing alternative. However, the presence of a GROUP BY or ORDER BY clause that is implemented by an index limits the possible join orders from which the optimizer can select. The first table in the join order is required to be the table over which the index is built. For example, if the criteria of the above GROUP BY clause (i.e., X.f3, X.f1) is indexed over table X, then table X is locked into the first position in the join order.

The transitive closure analysis of step 302 is beneficial under these circumstances to help free the join order that is otherwise locked by the GROUP BY or ORDER BY clause. For example, the SQL statement:
SELECT*from X INNER JOIN Y
ON X.f1=Y.f1
INNER JOIN Z
ON Y.f1=Z.f2
ORDER BY X.f1 has a number of equivalent search fields that will be determined through the transitive closure analysis of step 302. In particular, X.f1=Y.f1=Z.f2. As a result, the permutations of the ORDER BY clause that reference only a single table include:
SELECT*from X INNER JOIN Y
ON X.f1=Y.f1
INNER JOIN Z
ON Y.f1=Z.f2
ORDER BY X.f1 or ORDER BY Y.f1 or ORDER BY Z.f2

Now when performing step 308 to select the best performing permutation, the optimizer will be able to consider different join orders in making that selection. In particular, whichever ORDER BY clause is selected, only one table is referenced by the criteria in that clause (as before) and therefore the query is performed without the need to create a temporary file. Additionally, the optimizer can select a join order, in step 312, that locks table X, table Y, or table Z in the first spot thereby permitting the optimizer to consider a number of different join orders when optimizing the query plan. The optimal query plan is then forwarded to the database engine for execution in step 307.

The ability to change the join order does not necessarily reduce the number of tables referenced in the original ORDER BY or GROUP BY clause. In the immediate example above, the query originally only referenced a single table (i.e., table X). The transitive closure analysis, therefore, did not result in reducing the number of tables referenced by the clause; instead, it identified equivalent fields that still resulted in a single table being referenced but permitted different join orders to be analyzed and selected.

Another example illustrates the operation of the exemplary method of FIG. 3. Consider the SQL statement:
SELECT X.f3, Z.f2, count (*) FROM X
INNER JOIN Y ON X.f1=Y.f1 AND X.f3=Y.f3
INNER JOIN Z ON Y.f1=Z.f2
GROUP BY X.f1, Z.f2

Transitive closure analysis identifies the equivalency of X.f1=Y.f1=Z.f2; the equivalency of X.f3=Y.f3; and the equivalency of Y.f1=Z.f2. As a result, the possible permutations for the GROUP BY clause that reference a single table are:
a) GROUP BY X.f3, X.f1
b) GROUP BY Y.f3, Y.f1.

Each of these GROUP BY clauses only references a single table and can take advantage of an appropriate index built over that table in order to implement the GROUP BY without creating an intermediate temporary file. The optimizer, in step 310, will analyze different optimization strategies to determine whether table X or table Y should be in the first position in the join order. The join order will be adjusted if necessary, in step 312, by selecting one of the possible GROUP BY clauses and this join order will determine what permutation is selected in step 308 from among the possible permutations.

Various modifications may be made to the illustrated embodiments without departing from the spirit and scope of the invention. Therefore, the invention lies in the claims hereinafter appended.

What is claimed is:

1. A method for optimizing a database query in a computer of the type including a database management system, the database query including criteria that references a plurality of tables in order to re-order a result set generated for the database query, the method comprising the steps of, in the computer:
applying transitive closure analysis to at least one search condition in the query to identify an equivalent field for a field referenced in the criteria, wherein the criteria is one of a GROUP BY clause and an ORDER BY clause; and
based on the transitive closure analysis, rewriting the criteria to generate modified criteria to reduce the number of tables referenced thereby by substituting the equivalent field for the field referenced in the criteria, including rewriting the criteria to generate modified criteria that references only one table, based on the transitive closure analysis.

2. The method according to claim 1, further comprising the step of:
determining if the criteria references a first field from a first table and a second field from a second table.

3. The method according to claim 2, wherein the rewriting step comprises the step of:
rewriting the criteria to reference the first field and a third field from the first table, wherein a first search condition in the query searches on a match between the first field and the second field, and a second search condition in the query searches on a match between the second field and the third field, and wherein applying transitive closure analysis includes determining that the third field is equivalent to the second field in the criteria.

4. The method according to claim 1, further comprising the step of:
determining if the criteria references a plurality of tables.

5. The method of claim 1, further comprising the step of:
building an index over a column of the one table.

6. The method of claim 1, further comprising the step of:
building an index over more than one column of a table among the plurality of tables.

7. The method according to claim 1, wherein the database query involves a plurality of join operations and the method further comprises the step of:
running the query according to a join order that is based on the modified criteria.

8. A method of optimizing a database query in a computer of the type including a database management system, the database query including criteria that operates to re-order a result set of the database query and requires creating a temporary file during operation, the method comprising the steps of, in the computer:
applying transitive closure analysis to at least one search condition in the query to identify an equivalent field for a field referenced in the criteria, wherein the criteria is one of a GROUP BY clause and an ORDER BY clause; and
rewriting the criteria, based on the transitive closure analysis, to generate a modified criteria by substituting the equivalent field for the field referenced in the criteria, wherein the criteria references a plurality of tables and the modified criteria references a single table; said modified criteria operating to re-order a result set of the database query and avoid creating a temporary file during operation.

9. A method for optimizing a database query in a computer of the type including a database management system, the database query involving a plurality of join operations and a plurality of search conditions, the method comprising the steps of, in the computer:
applying transitive closure analysis to the plurality of search conditions in the query to determine a subset of equivalent search fields;
rewriting a criteria, that operates to re-order a result set of the database query, to generate a set of respective modified criteria that each reference one or more equivalent search fields, wherein the criteria is one of a GROUP BY clause and an ORDER BY clause;

identifying a subset of the respective modified criteria that reference a single, respective table; and selecting a join order from among a plurality of join orders for the plurality of join operations, including analyzing join orders using at least one of the set of respective modified criteria.

10. The method according to claim 9, further comprising the step of:

running the query according to a join order, the join order determined by selecting one of the set of respective modified criteria.

11. The method according to claim 9, further comprising the step of:

identifying a subset of the respective modified criteria that reference a single, respective table and for which an index to that table exists.

12. The method according to claim 9, further comprising the step of:

identifying a subset of the respective modified criteria that reference a single, respective table and for which an index is to be created.

13. The method according to claim 12, further comprising the step of:

running the query according to a join order, the join order determined by selecting one of the subset of respective modified criteria.

14. The method according to claim 9, further comprising the steps of:

performing cost analysis on each of the set of respective modified criteria; and running the query according to a join order, the join order determined based on the cost analysis.

15. A program product, comprising:

program code configured upon execution thereof to:

apply transitive closure analysis to at least one search condition in a query that includes criteria that references a plurality of tables in order to re-order a result set generated for the query, and based on the transitive closure analysis, rewrite the criteria to generate modified criteria to reduce the number of tables referenced thereby, wherein the criteria is one of a GROUP BY clause and an ORDER BY clause, wherein the program code is configured to apply transitive closure analysis to identify from the at least one search condition an equivalent field for a field referenced in the criteria, wherein the program code is configured to rewrite the criteria by substituting the equivalent field for the field referenced in the criteria, and wherein the modified criteria references only one table; and a recordable computer readable medium storing the program code.

16. The program product of claim 15, wherein the program code is further configured to:

run the query according to a join order that is based on the modified criteria.

17. A program product, comprising:

program code configured upon execution to:

apply transitive closure analysis to a plurality of search conditions to determine a subset of equivalent search fields within a database query involving a plurality of join operations and the plurality of search conditions, rewrite a criteria, that operates to re-order a result set of the database query, to generate a set of respective modified criteria that each reference one or more equivalent search fields, and select a join order from among a plurality of join orders for the plurality of join operations by analyzing join orders using at least one of the set of respective modified criteria, wherein the criteria is one of a GROUP BY clause and an ORDER BY clause, and wherein the program code is further configured to identify a subset of the respective modified criteria that reference a single, respective table; and a recordable computer readable medium storing the program code.

18. The program product of claim 17, further configured to:

run the database query according to a join order, the join ordered determined by selecting one of the set of respective modified criteria.

19. An apparatus, comprising:

at least one processor;

a memory coupled with the at least one processor; and a program code residing in memory and executed by the at least one processor, the program code configured to apply transitive closure analysis to at least one search condition in a query that includes criteria that references a plurality of tables in order to re-order a result set generated for the query, and based on the transitive closure analysis, rewrite the criteria to generate modified criteria to reduce the number of tables referenced thereby, wherein the criteria is one of a GROUP BY clause and an ORDER BY clause, wherein the program code is configured to apply transitive closure analysis to identify from the at least one search condition an equivalent field for a field referenced in the criteria, wherein the program code is configured to rewrite the criteria by substituting the equivalent field for the field referenced in the criteria, and wherein the modified criteria references only one table.

* * * * *